March 11, 1924.
M. JACKSON
SPEED INDICATING SIGNAL
Filed Feb. 11, 1922  2 Sheets-Sheet 1
1,486,379
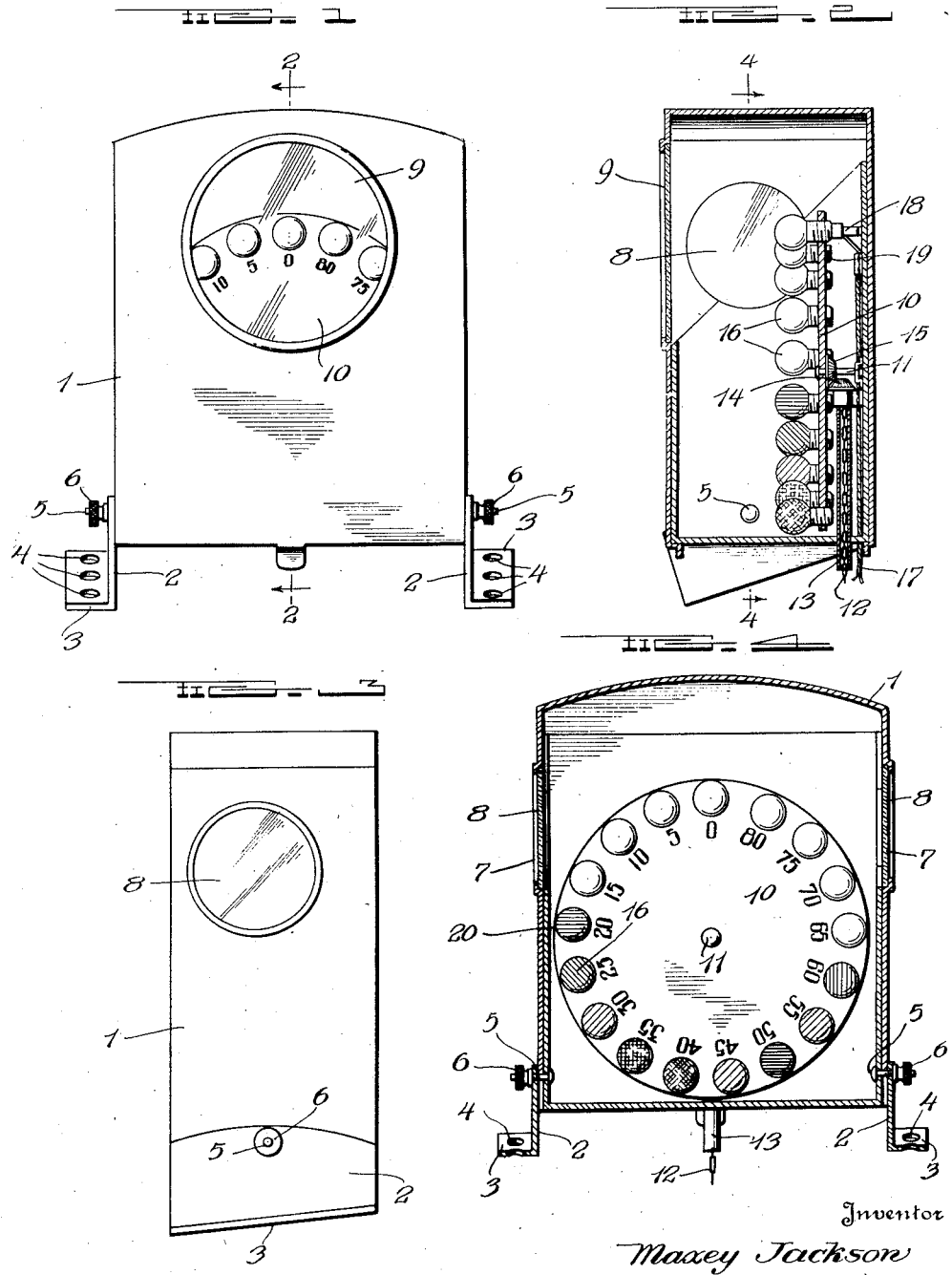
Inventor
Maxey Jackson
By E. H. Bond
Attorney March 11, 1924.
M. JACKSON
SPEED INDICATING SIGNAL
Filed Feb. 11, 1922    2 Sheets-Sheet 2
1,486,379
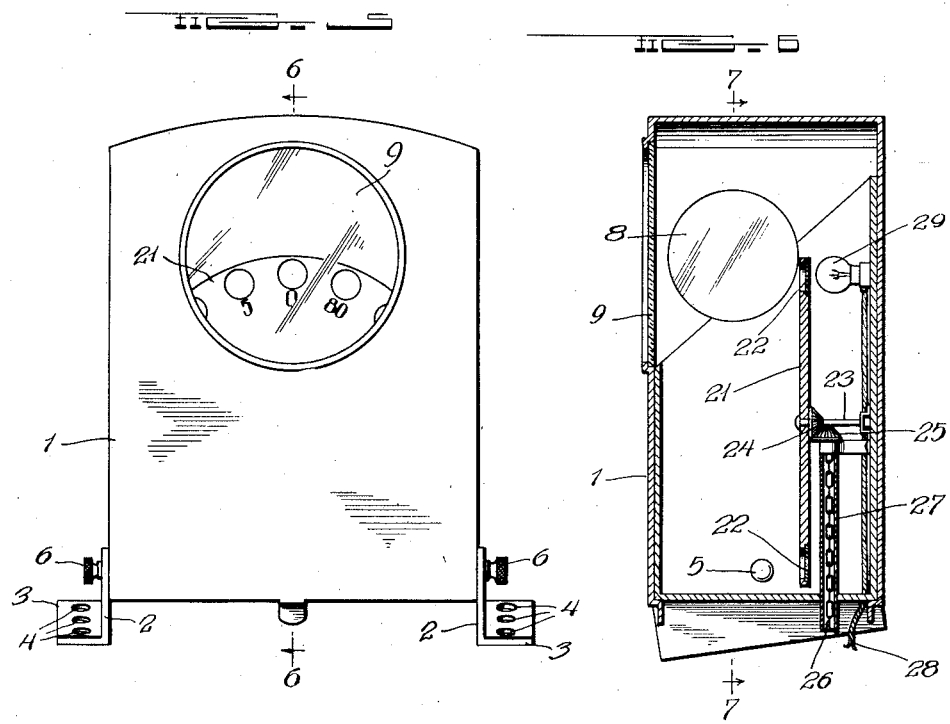
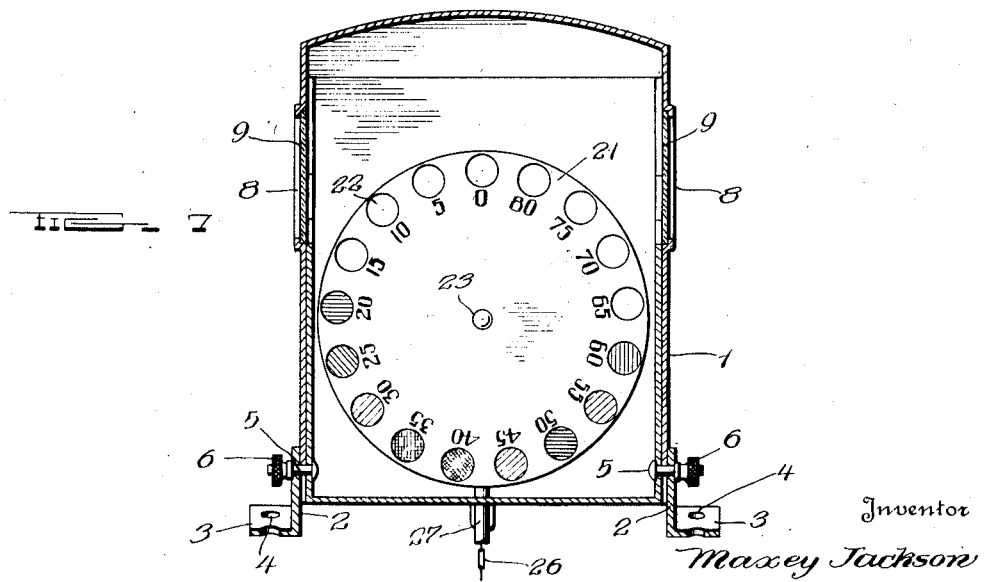
Inventor
Maxey Jackson
By E. H. Bond
Attorney Patented Mar. 11, 1924.

1,486,379

UNITED STATES PATENT OFFICE.

MAXEY JACKSON, OF PORTLAND, OREGON, ASSIGNOR, BY MESNE ASSIGNMENTS, TO MOTOR SAFETY INDICATOR, INC., A CORPORATION OF WASHINGTON.

SPEED-INDICATING SIGNAL.

Application filed February 11, 1922. Serial No. 535,686.

*To all whom it may concern:*

Be it known that I, MAXEY JACKSON, a citizen of the United States, residing at Portland, in the county of Multnomah and State of Oregon, have invented certain new and useful Improvements in Speed-Indicating Signals, of which the following is a specification.

This invention relates to certain new and useful improvements in speed indicating signals, of that general character in which a light is employed to indicate the speed at which a vehicle is traveling.

The present invention has for its objects among others to provide a simple and efficient device readily applied to a vehicle, in any desired position, in any convenient manner, either as a speedometer per se, or connected up with the speedometer on the vehicle. It is designed to indicate by the showing of a variety of colors of lights the rate of speed at which the vehicle is traveling. The showing of the different colored lights is accomplished by means of a revoluble member automatically controlled in its movements by the speed of the vehicle so that no attention thereof on the part of the driver of the car is necessary. It is absolutely dependable in its action, durable, not liable to get out of order, composed of few parts, those readily assembled and not liable to get out of order. It will effect a great saving of life and will aid the police in positively determining the rate of speed the car is traveling, for the light which is exhibited is a positive indisputable evidence of the speed at which the car is moving. For instance, if a blue light indicates a speed of 50 miles an hour, if the blue light is shown there can be no mistake as to the speed of the car. So with the red light and the others. There is no opportunity for dispute as to the speed, and the police can determine at a distance the rate at which the car is approaching. I may employ two of my improved devices, one at the front and one at the rear, if occasion should require. I can provide for visual indication to the driver as well as to the general public and the police so that all may readily know at what speed the car is moving.

Other objects and advantages of the invention will hereinafter appear and the novel features thereof will be specifically defined by the appended claims.

The generic idea of my present invention is capable of embodiment in a variety of forms, some only of which it has been thought necessary to herein illustrate.

The invention, in its preferred forms, is clearly illustrated in the accompanying drawings, which, with the numerals of reference marked thereon, form a part of this specification, and in which—

Figure 1 is a face view of my improved speed indicating signal.

Figure 2 is a vertical section through the same as on the line 2—2 of Figure 1, looking in the direction of the arrows.

Figure 3 is an edge view thereof.

Figure 4 is a vertical section, as on the line 4—4 of Figure 2, looking in the direction of the arrows.

Figure 5 is a face view of a modified form.

Figure 6 is a vertical section, as on the line 6—6 of Figure 5, looking in the direction of the arrows.

Figure 7 is a vertical section on the line 7—7 of Figure 6, looking in the direction of the arrows.

Like numerals of reference indicate like parts throughout the several views.

Referring to the drawings:—

Attention is directed first to Figures 1 to 4, in which 1 is a casing of any suitable shape and size adapted to contain the operating parts. It is designed to be attached to the dash-board, or any other convenient part of the vehicle; there may be one at the front and one at the rear, if desired. The operation will be the same whether affixed at the front or rear or on the fender. In the present instance, I have shown brackets 2 having flanges 3 with holes 4 for the reception of the securing means, and bolts 5 provided with thumb nuts so that the brackets may be held in position but readily adjusted to accommodate the casing to the support to which it is to be attached.

The device as herein disclosed may be manufactured as a speedometer complete in itself to be applied and operated by the same means that actuates the speedometer as now made, or it may be employed as an adjunct to the speedometer and operating in conjunction therewith.

The casing has the side openings 7 in which are disposed the lenses 8 through which the lights will show when lighted.

At the front there is the lens 9, through which the lights may be seen as they are in turn lighted according to the speed attained by the car.

10 is a disk mounted for revolution on a shaft 11 mounted in suitable bearings within the casing, the said shaft being designed to be revolved in any suitable manner through the medium of the member 12 which may be arranged within a tube 13, as shown in Figure 2, and operatively connected in any of the well-known ways with the axle-operated means as in the usual form of speedometer, which latter is not shown herein. 14 is a bevel gear operated by the speed controlled means in the usual way, and this gear meshes with a bevel gear 15 on the shaft 11 and revolves the disk. It is to be understood that this disk is free to turn in either direction, forward or backward, and carried by the said disk are a multiplicity of electric light bulbs 16 of different colors, for instance, the first to show through the lens 9 would be a white light, the next a light blue, the next a dark blue, the next an orange, the next green, and so on until a speed of sixty miles is reached, when a dark red light would be shown. The relative disposition of the colors of the lights, however, may be varied at will without in any wise departing from the spirit of the invention which is to have a different light for a different speed, the relation of the color of the light to the speed, however, being fixed in any one section, so that the pedestrian or others, or the police, may readily know for a certainty just what speed the car is making. There can be no question or ground for dispute as to the speed.

17 is a wire leading from the lighting system of the car and extended up within the casing, as seen in Figure 2, and connected with a contact 18 within the casing. This contact is arranged in the path of revolution of the bases 19 of the lamps 16, as will be readily understood from Figure 2.

In operation: Normally, of course, the disk remains stationary and no light will be shown. When the car attains a speed say of approximately fifteen miles an hour, the disk will have revolved to such an extent that the base of the white light 20 will be brought into contact with the contact 18 of the same and the lamp will be lighted. Now, if the speed increases the next lamp in rotation will be brought into engagement with the contact, with the result that it will be lighted and so on; each light indicating a fixed or predetermined rate of speed which will positively give visual indication of the rate at which the vehicle is traveling. If the speed slackens, of course, the disk, revolving in the reverse direction, will throw out the one light and light the next in order and so on. There can be no question as to the rate of speed because only the appropriate or predetermined lamp can be lighted at a given time, or position of the disk.

In the forms shown in Figures 5, 6 and 7, I have shown an embodiment of the same principle as just described, but in what may be termed a reversal of the parts, that is, instead of having a plurality of different colored lamps carried by the disk, the disk 21 is provided with a multiplicity of differently colored lenses 22, the colors being arranged in the same order as the differently colored lamps in the form shown in Figures 1 to 4. The disk 21 is operated in the same manner as in the other form, 23 being the shaft carrying the bevel gear 24 meshing with the bevel gear 25 actuated in the same manner as in the prior described form, 26 being the flexible member and 27 the enclosing tube therefor. In this form, 28 is the wire from the lighting system, and 29 a white light connected therewith and adapted to be at all times lighted when the speed indicating signal is to be used. The casing is the same and is designed to be affixed in desired position by the same form of means, or any other that may be found most desirable.

In operation, as the car is moving, the disk 21 will be revolved and as each lens 22 is in succession brought into position opposite the light 29, a light, colored in accordance with the color of the lens, will be shown. The result is the same as in the form above described in connection with Figures 1 to 4.

Any other suitable means may be provided for transmitting the motion to the disk, such as a knuckle joint or other analogous means usually employed under such conditions. It is to be understood that the bevel gear mechanism which I have chosen to herein illustrate is but one of the many forms of means for accomplishing the rotation of the disk.

In some cases I may provide for the showing of the lights to the driver, so that he may at all times know by the color of the light just what speed he is making. This would simply mean the duplication of the disk with the lights toward the driver, or the same disk with openings therein through which the lights would be visible by the driver. These and like minor changes are believed to come clearly within the scope of my invention and are such as do not require illustration.

From the foregoing, it will be evident that I have devised a simple, reliable and positive means for visually indicating the rate of speed at which a vehicle is moving and adapted to serve alone or connectible with the speedometer on the car, and while the structural embodiments of my invention as herein disclosed are what I at the present time consider preferable it will be understood that the same is subject to changes, variations and modifications in detail, proportion of parts, etc., without departing from the spirit of the invention or sacrificing any of its advantages. I, therefore, do not intend to restrict myself to such particular construction and arrangement of parts, but reserve the right to make such changes, variations and proportions of parts as come properly within the scope of the appended claims.

What is claimed as new is:—

1. In a speed indicator signal, a rotary member controlled in its movements by the speed of the vehicle, and differently colored means movable with said member whereby a different color light is displayed in accordance with the speed of the vehicle.

2. In a speed indicator signal, a rotary member, means for actuating the same in one direction or the other in accordance with the speed of the vehicle, and differently-colored means carried by the said member and arranged to display a differently colored light in accordance with the position of said member.

In testimony whereof I affix my signature.

MAXEY JACKSON.